Oct. 22, 1935.  C. G. STRANDLUND  2,017,873
PLOW
Filed March 12, 1934  2 Sheets-Sheet 2
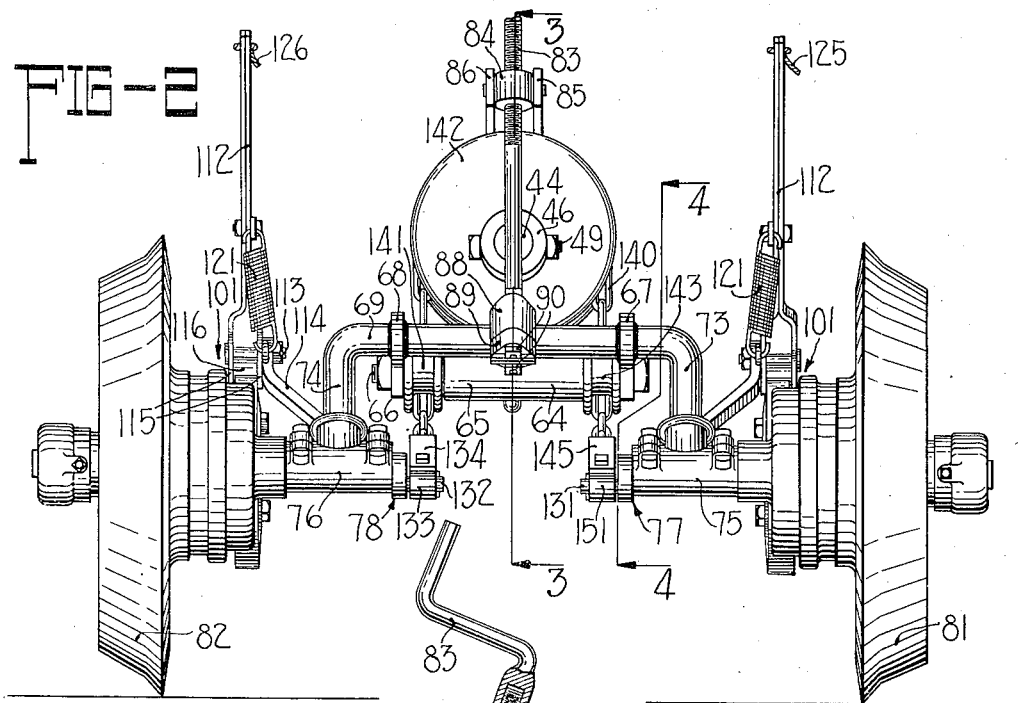
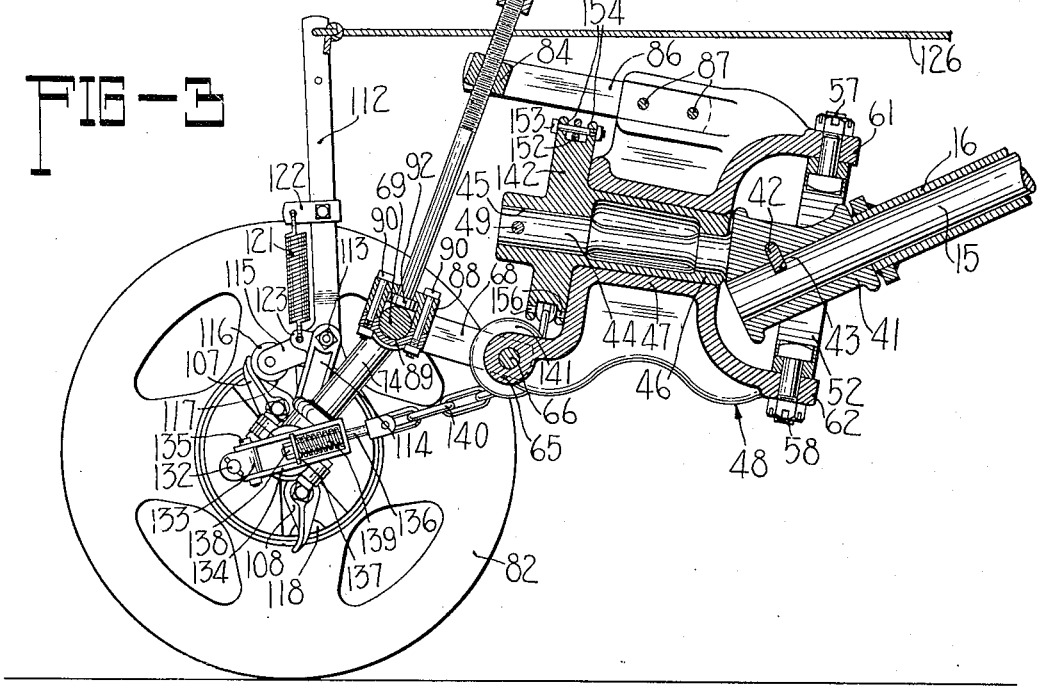
INVENTOR
Carl G. Strandlund
BY
Brown, Jackson, Boettcher & Dienner
ATTORNEYS.

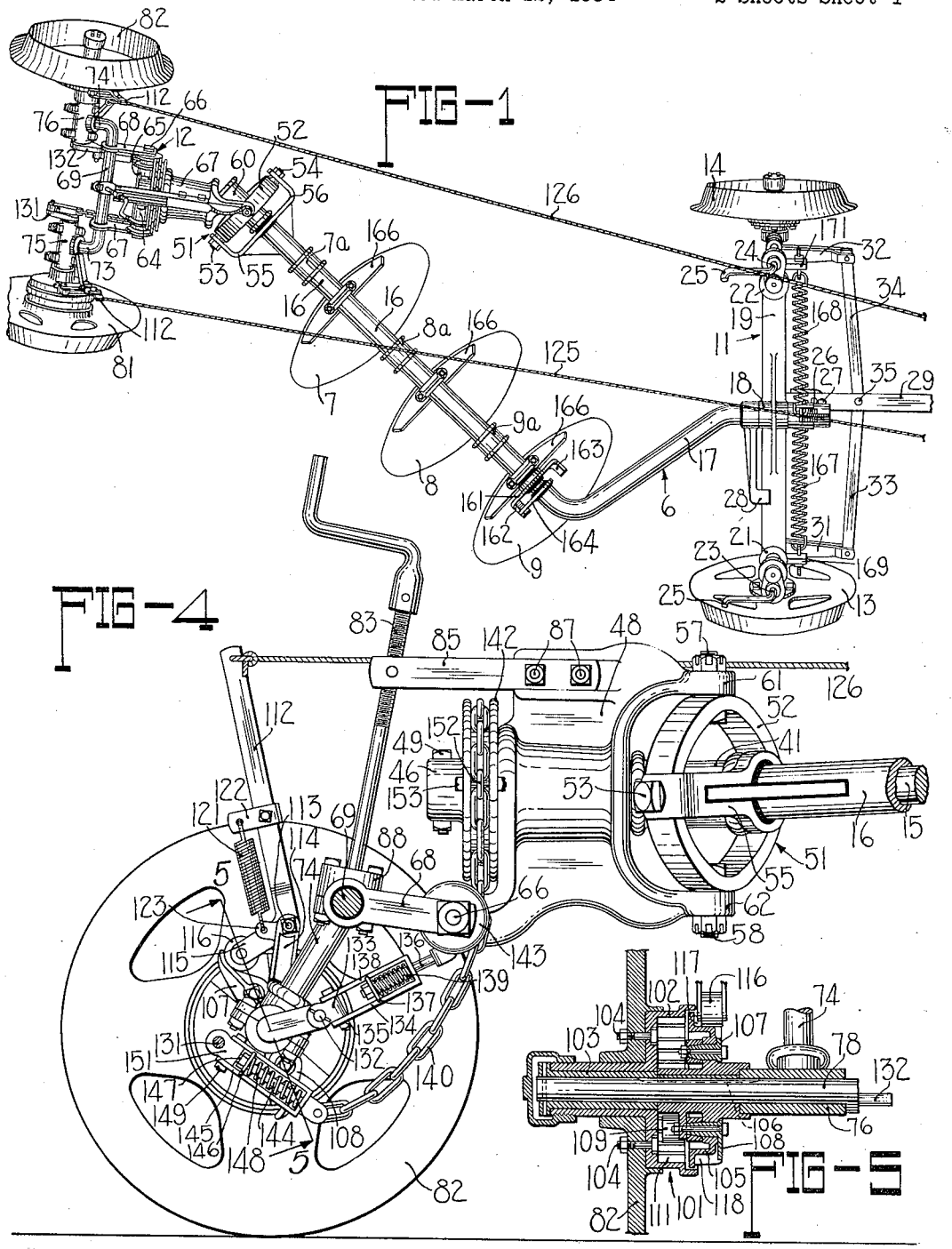

Patented Oct. 22, 1935

2,017,873

UNITED STATES PATENT OFFICE 2,017,873

PLOW

Carl G. Strandlund, Moline, Ill., assignor to Deere & Company, Moline, Ill., a corporation of Illinois Application March 12, 1934, Serial No. 715,086

22 Claims. (Cl. 97—26)

The present invention relates generally to plows and similar agricultural implements, and has for its principal object the provision of an implement embodying a tool supporting bar or frame movable into either of two operating positions or into an intermediate inoperative position by power lift mechanism. While the present invention is applicable to various types of agricultural implements, for convenience it has been illustrated in connection with a reversible disk plow, that is, one in which the furrow opening means can be arranged to open a right hand furrow or a left hand furrow, and wherein the plow is reversed by reversing the frame, or a portion thereof on which the furrow opening means is mounted, by swinging the same vertically about a generally longitudinal axis.

In all prior implements of this type with which I am familiar the tool supporting bar has been reversed or moved to an intermediate inoperative position by manually operated means, which, of course, makes it necessary for the operator to expend time and labor in making the adjustments. With this in view one of the objects of the present invention is to provide power lift means for moving the tool supporting bar or frame from either of its operating or working positions to its inoperative position, or from its inoperative position to either of its alternative working positions.

Another object of the invention is to provide suitable means in an implement of this general type provided with supporting wheels for utilizing power derived from such supporting wheels for moving the tool supporting bar from either operating position to its intermediate inoperative position.

A further object of the invention is to provide, in an implement having two lifting devices, spring means associated with each lifting device for overbalancing the tool supporting bar to move it from its raised inoperative position to one or the other of its operating positions upon actuation of one or the other of said lifting devices.

A still further object of the invention is to provide such overbalancing means that will react against each other to hold the tool supporting bar in its raised inoperative position whenever it is moved to such position.

Other objects and advantageous features of the present invention will be apparent from the following description of the preferred embodiment of the invention, taken in connection with the accompanying drawings, in which:

Figure 1 is a top plan view of a reversible disk plow in which the present invention has been embodied, illustrating the furrow opening means in working position in the ground and arranged to throw furrows to the right, and with the wheels tilted by reason of the left hand wheels running on the ground surface and the right hand wheels running in the furrow;

Figure 2 is an enlarged rear end view of the plow shown in Figure 1 with the various parts in the positions they assume when the furrow opening means is in a raised or inoperative position;

Figure 3 is a longitudinal vertical sectional view through the rear portion of the plow taken substantially on the plane of the line 3—3 of Figure 2, and illustrating the power lift means associated with the left hand rear wheel of the plow in the positions they assume when the plow is in its raised or inoperative position;

Figure 4 is a longitudinal vertical sectional view through the rear portion of the plow taken on the plane of the line 4—4 of Figure 2, but illustrating the various parts of the power lift mechanism in the positions they assume when the plow is in its lowered or working position while resting on a flat surface; and Figure 5 is a substantially vertical cross sectional view taken on the plane of the line 5—5 of Figure 4 and illustrating the several parts of the power lift clutch associated with the rear wheel shown in Figure 4.

The present invention has been illustrated in connection with a reversible disk plow similar in many respects to the construction illustrated and described in my copending application, Serial No. 715,085, filed March 12, 1934, and, therefore, such parts of the plow structure which are not particularly concerned with the present invention will be but briefly described.

Referring to Figure 1, the plow in which the present invention has been embodied comprises a generally longitudinally disposed frame structure indicated in its entirety by the reference numeral 6 and supporting three furrow opening disks 7, 8, and 9. The frame structure 6 is provided with front and rear supporting means, preferably in the form of a front truck 11 and a rear truck 12, the front truck being provided with dirigible wheels 13 and 14, while the rear truck is supported on suitable supporting wheels as will be hereinafter more particularly described. If desired, however, the front end of the implement may be mounted directly on a tractor.

The frame structure 6 is in the form of a suitable bar member 15 and comprises a front spindle section and a laterally bent section which terminates rearwardly in a diagonally disposed section the rear end of which serves as a rear spindle section and is shown in Figures 3 and 4. Journaled on the diagonally disposed section of bar member 15 is a sleeve 16 which supports the three disks 7, 8, and 9 before referred to, the disks being supported from the sleeve by suitable vertically extending standards provided with bearings at their lower ends in which the disks are journaled, the upper ends of said standards being secured to the lower ends of depending arms 7a, 8a and 9a (Figure 1) secured to the sleeve 16 as by welding or in any other suitable manner. The laterally bent section of the bar member 15 is enclosed in a reenforcing pipe 17, the pipe and the forward end of the bar 15 being bent at the same time and thereby forming a rigid section of the frame unit 6. The front spindle section of the frame 6 is journaled in a suitable sleeve or bearing 18 which is preferably formed as an integral part of a front axle casting 19 constituting the principal part of the front truck 11.

The laterally outer ends of the front axle 19 are formed with vertically disposed spindle sleeves 21 and 22 (see Figure 1), and these sleeves receive the vertical sections of spindles having laterally bent lower ends on which the front dirigible wheels 13 and 14 are mounted, the front axle being suitably supported on the spindles by means of adjusting crank screws 23 and 24, all as fully shown and described in said copending application above mentioned to which reference may be had if desired. Each of the crank screws 23 and 24 is provided with a handle portion 25, and the vertical position of the front wheels 13 and 14 with respect to the front axle 19 is controlled through the manipulation of the crank screws 23 and 24, and by controlling the vertical position of the front wheels, the depth of operation of the plow can be controlled, as will be readily understood.

The front spindle section at the forward end of the supporting frame bar structure 6 is held in position in the bearing sleeve 18 at the front by an arm 26 secured to the front end of the spindle section 15 by a bolt 27, and at the rear portion of the bearing sleeve 18 the spindle section is held in position by an arm 28 secured to the spindle section in any suitable manner. The arms 26 and 28 also perform other functions which will be referred to later. The plow is propelled by means of a draft bar 29 pivotally connected to the front truck in any suitable manner. A tractor, draft animals, or any other suitable means may be connected with the bar 29 to propel the plow. The front wheels 13 and 14 are dirigible wheels and pivot, respectively, about the axes of the spindle sections 23 and 24, above mentioned. The plow is guided by suitable steering connections between the draft bar 29 and the front wheels 13 and 14, said steering connections including forwardly extending arms 31 and 32 suitably secured to the lower portions of the spindles. The forward ends of the arms 31 and 32 are connected by means of links 33 and 34 to the draft bar 29, the inner ends of the links being pivotally connected to the draft bar 29 by means of a pin 35. Thus, whenever the draft tongue 29 is turned laterally with respect to the front axle 19, the wheels 13 and 14 are steered in substantial parallelism with respect to the tongue 29.

The rear end of the plow frame 6 is supported as follows: The rear end of the bar member 15 is anchored in a casting 41 by means of a wedge pin 42 which extends through holes in the casting 41 and engages in a notch 43 in the rear end of the bar 15. A shank portion 44 is formed integral with the casting 41 and is disposed in a boring 45 formed in a sleeve member 46 which, in turn, is journaled in a bearing sleeve 47 formed integral with the rear supporting casting 48 which forms a part of the rear truck 12. The boring 45 in the sleeve member 46 is disposed eccentrically with respect to the axis of said member 46 for a purpose which will be hereinafter described. Normally, the sleeve 46 and the shank 44 are connected together by means of a pin or bolt 49 which prevents said parts from rotating relative to one another but which provides for the rotation of the sleeve in the bearing 47.

The sleeve 16, upon which the disks 7, 8, and 9 are fixedly supported and which is journaled for rocking movement on the diagonal section of the supporting bar 15, is held so as to dispose the 20 depending arms 7a, 8a and 9a in a vertical plane in all positions of the disk supporting frame bar by means of a universal connection with the rear supporting casting 48 which forms a part of the rear truck 12. The universal connection is indicated in its entirety by the reference numeral 51 and comprises a ring 52 pivotally supported on the rear end of the supporting sleeve 16 by means of pivot bolts 53 and 54 (Figure 1) carried at the ends of diametrically disposed arms 55 and 56 securely fixed as by welding, to the rear end of the pipe member or sleeve 16. The ring member 52 is also pivotally connected, as by pivot bolts 57 and 58, to upper and lower forwardly extending arms 61 and 62, respectively, which are preferably although not necessarily formed integral with the rear casting 48.

By virtue of this construction, whenever the supporting bar structure 6 of the plow is rocked about the longitudinal axes defined by the front and rear spindle sections, the sleeve member 16 is constrained to hold the depending arms 7a, 8a, and 9a, and the disk standards secured thereto in substantially a vertical position at all times by virtue of the universal connection 51 just described.

The rear casting 48 is provided with laterally extending sleeve sections 64 and 65 (see Figures 1 and 2) cored to receive a pivot bolt 66 which, at its ends, carries rearwardly disposed arms 67 and 68 welded at their rear ends to a crank axle or shaft 69. The crank axle 69 is provided with crank portions or arms 73 and 74 having their outer ends fixedly connected in any suitable manner with bearing sleeves 75 and 76 in which are journaled axles 77 and 78 supported on rear wheels 81 and 82, respectively.

The position of the crank axle 69 relative to the supporting casting 48 is controlled by means of a crank screw 83 which is threaded into a nut 84, the latter being supported by trunnions pivoted in the rear ends of brackets 85 and 86 fixed to the supporting casting 48 by means of bolts 87. As shown in Figure 3, the lower end of the crank screw 83 has a swivel connection with the crank axle 69 established by the provision of a pair of blocks 88 and 89 embracing the mid-portion of the crank axle 69 and bolted together by means of bolts 90. The upper block 88 is provided with a socket for receiving an enlarged portion 92 formed on the lower end of the crank screw 83. Turning the latter in one direction or the other swings the crank axle 69, and hence the rear wheels 81 and 82 journaled thereon, upwardly or downwardly about the transverse axes defined by the pivot bolt 66.

According to the present invention, the means by which the frame bar 6 is swung from one side to the other to dispose the tool means in either of its alternative operating positions, or to dispose the same in raised non-working position, is in the form of power lift mechanism and the same will now be described.

Each of the wheels 81 and 82 has associated therewith a half revolution clutch 101, through the agency of which the axles 77 and 78 may be rotated by power derived from their associated wheel. The two half revolution clutches 101 are similar in construction and of conventional design, and, therefore, but one of them will be described herein. Referring more particularly to Figure 5, which illustrates in section the half revolution clutch associated with the wheel 82 and axle 78, said clutch comprises a continuously rotating drum member 102 journaled upon a sleeve 103 fixed to the outer end of the axle 78 in any suitable manner, as by a pin or the like. The wheel 82 is fixedly connected to the drum 102 by means of a plurality of bolts 104. A plate member 105 is fixedly secured to the axle 78, as by means of a key 106 engaging in suitable slots provided respectively in said plate member and said axle. The plate member 105 has two dogs 107 and 108 pivoted thereto on diametrically opposite sides of the axle 78, and said dogs are connected together by means of a link (not shown) so as to operate in unison, as is usual in clutches of this type. The dog 108 carries a roller 109 which is adapted to engage in corrugations 111 provided on the interior of the drum member 102 through the action of a suitable spring (not shown), connected to one of the dogs, when the clutch is thrown into operation to rotate the axle 78 by power derived from the wheel 82. The roller 109 is, however, normally held out of engagement with the corrugations 111 by a trip lever 112 (see Figure 3) pivotally connected near its lower end by a pivot bolt 113 to an arm 114 (see Figures 2 and 4), which is welded or otherwise secured to the arm 74 of the crank axle 69 or to the sleeve 76. The trip lever 112 adjacent its pivot connection 113 is bifurcated as shown in Figure 2 and is provided with a laterally extending portion 115 between the arms of which a roller 116 is journaled. The roller 116 is adapted to engage in either of two diametrically disposed notches 117 and 118 formed in the plate member 105. The dogs 107 and 108 pivotally carried by the plate member 105 are disposed so as to be engaged by the roller 116, and when said roller 116 is in engagement with either of said interconnected dogs, 107 or 108, the roller 109 carried by the dog 108 is held out of engagement with the corrugations 111 on the interior of the drum 102 when the roller 116 is in either of the notches 117 or 118, respectively.

Means is provided for normally holding the trip lever 112 in the position shown in Figure 3, which illustrates the positions of the various parts of the mechanism when the furrow opening means are in a raised inoperative position. This means comprises a spring 121 connected at its upper end to a bracket 122 carried by and extending laterally from the trip lever 112 about midway of its length, and connected at its lower end to a laterally extending lug 123 provided on the arm 114. As will be readily understood, by swinging the trip lever 112 in a clockwise direction the roller 116 will be disengaged from one or the other of the notches 117 or 118 as the case may be, and said roller will also at the same time be disengaged from the respective dog 107 or 108 adjacent thereto, whereupon the roller 109 carried by the dog 108 will engage in the corrugations 111 in the drum 102 to lock said drum and the plate member 105 together and thereby cause the plate member 105 and the shaft 78 which is keyed thereto to rotate through a half revolution. After the trip lever is swung to operate the clutch as above described and is released by the operator, the spring 121 will act to return the lever to its normal position as shown in Figure 3, whereupon the roller 116 will engage in the other of the notches 117 or 118 and will also engage the other of the dogs 107 or 108.

As the clutches 101 are half revolution clutches, as above mentioned, the trip lever 112 must be immediately released by the operator after tripping so that the several parts may return to their normal positions by the time the clutch makes a half revolution. If the lever 112 is not released by the operator by the time the clutch makes a half revolution the clutch will continue to operate for another half revolution, thereby moving the supporting bar into its alternative operating position. The trip lever 112, therefore, acts as releasable means for preventing the lifting device from moving the supporting bar beyond its intermediate inoperative position and into its other operating position.

A rope 125 extending up to the operator's position on the tractor is connected to the trip lever 112 of the clutch 101 associated with the wheel 81 for operating said clutch, and another rope 126 also extending to the operator's position on the tractor is connected to the trip lever 112 of the clutch 101 associated with the wheel 82 for operating that clutch.

The inner ends of the axles 77 and 78 are provided respectively with cranks 131 and 132, and said cranks are operatively connected with the rear end of the frame bar member 15 for rotating said member on its spindles to move the same from either of its working positions to its raised or inoperative position by mechanism which will now be described.

Pivotally connected to the crank 132 is a suitable member or fitting 133 to which a relatively long U-shaped bracket 134 is connected by means of a bolt 135. A relatively long bolt 136 extends loosely through a perforation provided in the base portion of the bracket 134 and carries a slide 137 at its rear end held in position by means of a nut 138 threaded on the rear end of the bolt 136. A coiled compression spring 139 embraces the bolt 136 and is disposed between the base portion of the bracket 134 and the slide 137. One end of a chain 140 is fixedly connected to the forward end of the bolt 136. This chain 140 passes over a roller 141 journaled on the bolt 66 before described, thence upwardly over a sheave 142 formed integral with or fixedly connected to the rear end of the sleeve 46, and thence downwardly over a roller 143 journaled on the opposite end of the bolt 66 from the roller 141, and has its opposite end connected to a bolt 144 (Figure 4) similar to the bolt 136. The bolt 144 is operatively connected to the crank 131 on the axle 77 of the wheel 81 by mechanism which is similar to the mechanism connecting the bolt 136 to the crank 132 on the axle 78, said mechanism comprising a U-shaped bracket 145, a slide 146 carried by the bolt 144 and held in position by means of a nut 147, and a coiled compression spring 148 embracing the bolt 144 and disposed between the base portion of the bracket 145 and the slide 146. The U-shaped bracket 145 is connected by means of a bolt 149 to a suitable member or fitting 151 which is pivotally connected to the crank 131 of the axle 77.

The central link 152 of the chain 140 is connected to the sheave 142 by means of a bolt 153 which passes through suitable aligned perforations 154 provided in the flanges of the sheave and through such central link, as shown in Figures 3 and 4, whereby equal portions of the chain are disposed on either side of the sheave 142.

The chain 140 is of such length that when both the cranks 131 and 132 are in the position shown in Figure 2, the supporting frame bar 6 of the plow will be in its raised or inoperative position; both springs 139 and 148 will be compressed and will react against each other to hold the supporting frame bar 6 in such raised or inoperative position. When in this position the roller 116 of each of the clutch actuating levers 112 will be engaged in one or the other of the diametrically disposed notches 117 or 118 in its associated plate member 105 and will also be in engagement with one of its associated dogs 107 and 108 whereby the roller 109 carried by the dog 108 of each of the clutches 101 will be held out of contact with the corrugations 111 on the interior of the drum 102 and the wheels will be free to rotate.

Now if the clutch of the wheel 82, for example, is tripped by pulling forward on the rope 126 as the plow is advanced, the roller 116 will be released from the notch 117 or 118 as the case may be and will also be moved out of engagement with the respective dog 107 or 108. The roller 109 carried by the dog 108 will then be moved by its spring into engagement with the corrugations 111 on the interior of the drum 102, thereby locking the wheel 82 to the axle 78 so as to rotate the axle to position the crank 132 in the position shown in Figures 1 and 4. This movement of the crank releases the tension in the spring 139 and the compression spring 148 associated with the crank 131 of the wheel 81 will now function to overbalance the frame bar 15 towards the right, after which gravity will act to drop the frame bar into the working position shown in Figure 1.

As will be readily appreciated, if the clutch lever 112 associated with the wheel 81 had been actuated by the pulling forward on the rope 125 to trip the clutch 101 associated with that wheel, the crank 131 would have been similarly disposed in its alternative position from that shown in Figure 1, and the compression spring 139 would have functioned to overbalance the frame bar 6 to the left sufficiently so that gravity would cause it to drop into its alternative working position. After the frame bar 6 has been lowered to either of its operating positions as above described, the disks will penetrate into the soil until the outer end of the arm 28, secured to the frame bar 6 in rear of the bearing 18, strikes the top of the front axle 19, as clearly shown in Figure 1.

When it is desired to raise the plow from either of its working positions to its raised or inoperative position, it is only necessary to actuate the proper clutch lever. For example, if the plow is in the working position shown in Figure 1 and it is desired to raise the plow to its inoperative position, it is only necessary to pull forward on the rope 126 to move the clutch actuating lever 112 associated with the clutch 101 of the wheel 82 to lock the clutch parts in engagement, and the clutch will operate to turn the crank 132 a half revolution back to the position shown in Figure 2, at which time both the springs 139 and 148 will be compressed and will react against each other to hold the plow in its raised position.

In most plows of the type described above, it is desirable to dispose the rear trucks 12 at a given angular position relative to the longitudinal frame bar 6, so as to maintain the furrow openers in the proper position relative to their work. For example, when the furrow openers are disks, the rear truck is so angled with respect to the line of advance as to give the wheels 81 and 82 a lead in a direction away from the land. This is necessary in disk plows to prevent the disks from cutting too wide a furrow. In the present construction, by changing the angular relation between the rearwardly extending spindle shank 44 and the rear truck 12, the proper lead for the rear truck may be provided, and since the shank 44 is disposed in eccentric relation with respect to the sleeve 46, the angularity of the rear truck may be varied as desired by adjusting the position of the sleeve relative to the shank, not only to adjust the plow for various kinds or numbers of furrow openers, but also to vary the width of cut. For example, in the disk plow shown, the total width cut by the three disks 7, 8, and 9 may be controlled by varying this angle of lead.

In the present construction the rear wheels 81 and 82 may be set in either of two positions. With the parts arranged as shown in the drawings, the wheels are given a lead of about 5° with respect to the direction of advance, and by turning the sleeve 46 180° relative to the shank 44 the wheels 81 and 82 will be given a lead of about 10°, the width of cut being lessened appreciably when the wheels are in the second position. To make the adjustment in this plow the pin 49 which locks the sleeve 46 and shank portion 44 of the casting 41 together is first removed, and then the bolt 153 which connects the center link 152 of the chain with the sheave 142 is removed, after which the sleeve 46 together with the sheave 142 is rotated in its bearing substantially through 180° until the extra set of perforations 156 provided in the sheave 142 have been brought opposite the central link 152. Then the bolt 153 is placed in the perforations 156 and in the central link 152, and the pin 49 is replaced in the sleeve 46 and shank portion 44.

Stop means similar to that shown and described in my above mentioned copending application has been provided between the forward end of the disk supporting sleeve 16 and the frame bar 15, whereby when the plow is in operation the front truck 11 can be utilized to offset the stresses tending to rotate the sleeve 16 and raise one of the wheels of the rear truck, as fully described in said copending application. This stop means comprises an arm 161 fixed to the forward end of the sleeve member 16 and having stop lugs 162 and 163 adapted to engage an arm 164 fixed to the rear end of the pipe member 21 mounted on the forward laterally bent section of the frame bar 15. The arm 164 contacts with stop lug 162 when the plow is in the operating position shown in Figure 1 and with the stop lug 163 when the plow is in the alternative working position. By virtue of this construction it will be seen that the pressure of the soil against the disks and the resultant tendency to rotate the sleeve member 16 are resisted by both the front and rear supporting means, that is, the front and rear trucks 11 and 12 in the illustrated construction.

Each of the disks 7, 8 and 9 is provided with a scraper 166 suitably supported on the sleeve 16. The mounting of these scrapers on the sleeve so as to function to scrape the disks in either direction of their rotation is fully shown and described in my above mentioned copending application, and as the present invention is not particularly concerned with the particular form of the scrapers, a detailed showing and description thereof are deemed unnecessary.

For aiding the clutch means in the raising and lowering operations spring means has been associated with the forward end of the furrow opener supporting bar. For this purpose, the arm 26, which is fixed to the forward end of the front spindle portion of the bar 15, is formed with diametrically arranged arm sections, and springs 167 and 168 are connected, respectively, to the outer ends of these arm sections. The outer ends of the springs 167 and 168 are anchored to lugs 169 and 171 extending forwardly from the sleeve portions 21 and 22.

It is to be understood that while the present invention has been shown as incorporated in a reversible disk plow, the invention is not to be specifically limited to such a construction, inasmuch as the broad principles of the invention are equally applicable to implements of other types, as will be readily apparent from the appended claims.

I claim:

1. An implement comprising a tool supporting bar mounted for movement into working and non-working positions and having a spindle at each end, tool means carried by said bar, a bearing in which the front spindle is journalled for rotation about a generally longitudinal axis, means for supporting said bearing, a rear frame having a bearing in which the rear spindle portion of said bar is journaled, wheel means supporting said frame, and means deriving power from said wheel means for rotating said supporting bar in its bearings to raise said tool means from a working to a non-working position.

2. A reversible implement comprising a tool supporting bar mounted for movement into either of two operating positions and having a spindle at each end, tool means carried by said bar, a bearing in which the front spindle portion is journaled for rotation about a generally longitudinal axis, means for supporting said bearing, a two-wheel supported frame having a bearing in which the rear spindle of said bar is journaled, and means deriving power from said wheels for rotating said supporting bar in its bearings to dispose said tool means in either of its alternative operating positions.

3. An implement comprising a tool supporting bar mounted for movement into either of two working positions or into a non-working position, a spindle at each end of said bar, tool means carried by said bar, a bearing in which the front spindle is journaled for rotation about a generally longitudinal axis, means for supporting said bearing, a two-wheel supported frame having a bearing in which the rear spindle portion of said bar is journaled, and a half-revolution clutch associated with each of said wheels and connected with the rear spindle portion of said bar for rotating said bar from either of its working positions to a raised non-working position.

4. A reversible implement comprising a tool supporting bar mounted for movement into either of two operating positions and having a spindle at each end, tool means carried by said bar, a bearing in which the front spindle portion is journaled for rotation about a generally longitudinal axis, means for supporting said bearing, a two-wheel supported frame having a bearing in which the rear spindle of said bar is journaled, and means for deriving power from one of said wheels to rotate said supporting bar to dispose said tool means in one operating position, and means for deriving power from the other of said wheels to rotate said supporting bar to dispose said tool means in the other operating position.

5. A reversible implement comprising a tool supporting bar mounted for movement into either of two operating positions or into an inoperative position, a spindle at each end of said bar, tool means carried by said bar, a bearing in which the front spindle portion is journaled for rotation about a generally longitudinal axis, means for supporting said bearing, a two-wheel supported frame having a bearing in which the rear spindle of said bar is journaled, means for deriving power from one of said wheels to rotate said supporting bar from one operating position to a raised inoperative position, and means for deriving power from the other of said wheels to rotate said supporting bar from its other operating position to a raised inoperative position.

6. The combination with an implement having a tool supporting bar mounted for movement into either of two operating positions or into an intermediate inoperative position, of a lifting device for moving said supporting bar from one operating position to its inoperatve position, a second lifting device for moving said supporting bar from its other operating position to its inoperative position, and means associated with each of said lifting devices providing for movement of the supporting bar in response to actuation of either lifting device while the other is held in fixed position.

7. The combination with an implement having a tool supporting bar mounted for movement into either of two operating positions or into an intermediate inoperative position, of a lifting device for moving said supporting bar from one operating position to its inoperative position, a second lifting device for moving said supporting bar from its other operating position to its inoperative position, and spring means associated with each of said lifting devices and reacting against each other to hold said supporting bar in its inoperative position.

8. The combination with an implement having a tool supporting bar mounted for movement into either of two operating positions or into a substantially balanced intermediate inoperative position, of a lifting device for moving said supporting bar from one operating position to its inoperative position, and a second lifting device for moving said supporting bar from its second operating position to its inoperative position, said first lifting device including means for overbalancing said supporting bar from its inoperative position toward said second operating position, and said second lifting device including means for overbalancing said supporting bar from its inoperative position toward said first operating position.

9. The combination with an implement having a tool supporting bar mounted for movement into either of two operating positions or into a substantially balanced intermediate inoperative position, of a lifting device for moving said supporting bar from one operating position to its intermediate inoperative position and including overbalancing means tending to move said supporting bar to a point beyond its intermediate inoperative position toward its other operating position, and a second lifting device for moving said supporting bar from said other operating position to its intermediate inoperative position and including overbalancing means tending to move said supporting bar to a point beyond its intermediate inoperative position toward said first operating position, said overbalancing means reacting against each other to hold said supporting bar in its intermediate inoperative position.

10. The combination with an implement having a tool supporting bar mounted for movement into either of two operating positions or into an intermediate inoperative position, of a lifting device for moving said supporting bar from one operating position to its intermediate inoperative position, a second lifting device for moving said supporting bar from its other operating position to its intermediate inoperative position, each of said lifting devices including means tending to move said supporting bar to its other operating position, and releasable means preventing said lifting device from moving said supporting bar beyond its intermediate inoperative position and into its other operating position.

11. An implement comprising a tool supporting bar having a spindle at each end, tool means carried by said bar, a bearing in which the front spindle is journaled for rotation about a generally longitudinal axis, means for supporting said bearing, a two-wheel supported frame having a bearing in which the rear spindle portion of said bar is journaled, and means deriving power from one of said wheels for rotating said supporting bar in its bearings to raise said tool means from a working to a non-working position, said means comprising a sheave fixed to the rear spindle portion of said bar, a half revolution clutch associated with said wheel, and means connecting said clutch with said sheave for rotating the latter.

12. An implement comprising a tool supporting bar having a spindle at each end, tool means carried by said bar, a bearing in which the front spindle is journaled for rotation about a generally longitudinal axis, means for supporting said bearing, a two-wheel supported frame having a bearing in which the rear spindle portion of said bar is journaled, and means deriving power from one of said wheels for rotating said supporting bar in its bearings to raise said tool means from a working to a non-working position, said means comprising a crank, a sheave fixed to the rear spindle portion of said bar, and means connecting said crank with said sheave whereby swinging of said crank rotates said sheave.

13. An implement comprising a tool supporting bar having a spindle at each end, tool means carried by said bar, a bearing in which the front spindle is journaled for rotation about a generally longitudinal axis, means for supporting said bearing, a two-wheel supported frame having a bearing in which the rear spindle portion of said bar is journaled, and means deriving power from one of said wheels for rotating said supporting bar in its bearings to raise said tool means from a working to a non-working position, said means comprising an axle on which said wheel is journaled, a crank on said axle, a half revolution clutch associated with said wheel and adapted to operatively connect the latter with said axle upon actuation of said clutch, a sheave fixed to the rear spindle portion of said bar, and means connecting said crank with said sheave whereby said sheave is rotated upon actuation of said crank.

14. A reversible implement comprising a tool supporting bar having a spindle at each end, tool means carried by said bar, a bearing in which the front spindle portion is journaled for rotation about a generally longitudinal axis, means for supporting said bearing, a two-wheel supported frame having a bearing in which the rear spindle of said bar is journaled, said bar being movable about the axes of said spindles to two operating positions and to an inoperative position, means deriving power from one of said wheels for rotating said supporting bar from one operating position to its inoperative position, said means including overbalancing means tending to move said supporting bar from its inoperative position to its other operating position, and means deriving power from the other of said wheels for rotating said supporting bar from its other operating position to its raised inoperative position, said last-named means including overbalancing means tending to move said supporting bar from its inoperative position to its other operating position.

15. A reversible implement comprising a tool supporting bar having a spindle at each end and mounted for movement into either of two operating positions or into an intermediate inoperative position, tool means carried by said bar, a bearing in which the front spindle portion is journaled for rotation about a generally longitudinal axis, means for supporting said bearing, a supporting member having a bearing in which the rear spindle of said bar is journaled, said supporting member including a crank axle having two crank arms, a sleeve fixed to each of said arms, an axle journaled in each of said sleeves, a supporting wheel journaled on each of said axles, a half revolution clutch associated with each of said wheels, means for rotating said axles upon actuation of said clutches, each of said axles having a crank, and means connecting said cranks with said rear spindle whereby actuation of either of said clutches rotates said spindle to move said bar when in an operating position from such position to an inoperative position.

16. A reversible implement comprising a tool supporting bar having a spindle at each end and mounted for movement into either of two operating positions or into an intermediate inoperative position, tool means carried by said bar, a bearing in which the front spindle portion is journaled for rotation about a generally longitudinal axis, means for supporting said bearing, a supporting member having a bearing in which the rear spindle of said bar is journaled, said supporting member including a crank axle having two crank arms, a sleeve fixed to each of said arms, an axle journaled in each of said sleeves, a supporting wheel journaled on each of said axles, a half revolution clutch associated with each of said wheels, means for rotating said axles upon actuation of said clutches, each of said axles having a crank, and means connecting said cranks with said rear spindle whereby actuation of either of said clutches rotates said spindle to move said bar when in an operating position from such position to an inoperative position, said connecting means including spring means on either side of said spindle coacting against each other to hold said bar in raised position.

17. A reversible implement comprising a tool supporting bar having a spindle at each end and mounted for movement into either of two operating positions, or into a balanced intermediate inoperative position, tool means carried by said bar, a bearing in which the front spindle portion is journaled for rotation about a generally longitudinal axis, means for supporting said bearing, a supporting member having a bearing in which the rear spindle of said bar is journaled, a crank axle journaled on said member and having two crank arms, a sleeve fixed to each of said crank arms, an axle journaled in each of said sleeves, a supporting wheel journaled on each of said axles, a half revolution clutch associated with each of said wheels, means for rotating said axles upon actuation of said clutches, each of said axles having a crank, and means connecting said cranks with said rear spindle and including spring means on either side of said spindle whereby actuation of both of said clutches moves said bar to an inoperative position, one of said spring means acting against said rear spindle to move said bar from its balanced intermediate inoperative position towards its operating position on that side when the clutch on the opposite side is subsequently actuated, and the other spring means acting against said rear spindle to move said bar from its balanced intermediate inoperative position towards its operating position on that side when the clutch on the opposite side is subsequently actuated.

18. The combination with an implement having a tool supporting bar rotatably supported for movement into either of two lowered operating positions or into an intermediate raised inoperative position, of means for rotating said bar, said means comprising a sheave fixed to said bar, a chain fixed to said sheave, a lifting device operatively connected to one end of said chain for moving said chain to rotate said sheave in one direction to raise said bar from one operating position to its intermediate inoperative position, and a second lifting device operatively connected to the other end of said chain for moving said chain to rotate said sheave in the opposite direction to raise said bar from its other operating position to its intermediate inoperative position.

19. The combination with an implement having a tool supporting bar rotatably supported for movement into either of two lowered operating positions or into an intermediate raised inoperative position, of means for rotating said bar, said means comprising a sheave fixed to said bar, a chain fixed to said sheave, a lifting device operatively connected to one end of said chain for moving said chain to rotate said sheave in one direction to raise said bar from one operating position to its intermediate inoperative position, and a second lifting device operatively connected to the other end of said chain for moving said chain to rotate said sheave in the opposite direction to raise said bar from its other operating position to its intermediate inoperative position, said operative connections including spring means reacting against each other to hold said supporting bar in its intermediate inoperative position.

20. The combination with an implement having a tool supporting bar rotatably supported for movement into either of two lowered operating positions or into a raised and balanced intermediate inoperative position, of means for rotating said bar, said means comprising a sheave fixed to said bar, a chain fixed to said sheave, a lifting device operatively connected to one end of said chain for moving said chain to rotate said sheave in one direction to raise said bar from one operating position to its intermediate inoperative position, a second lifting device operatively connected to the other end of said chain for moving said chain to rotate said sheave in the opposite direction to raise said bar from its other operating position to its intermediate inoperative position, and releasable means for locking said lifting devices to hold said supporting bar in its intermediate inoperative position, the spring means at one side acting against said sheave to overbalance said bar for movement towards that side upon release of the locking means at the other side, and the spring means at the other side acting against said sheave to overbalance said bar for movement towards that side upon release of the other locking means.

21. The combination with an implement having a tool supporting bar mounted for movement into either of two operating positions or into an intermediate inoperative position, of a lifting device for moving said supporting bar from one operating position to its inoperative position, and a second lifting device for moving said supporting bar from its second operating position to its inoperative position, said first lifting device including means for urging said supporting bar from its inoperative position toward said second operating position, and said second lifting device including means for urging said supporting bar from its inoperative position toward said first operating position.

22. A reversible implement comprising a tool supporting bar having a spindle at each end and mounted for movement into either of two operating positions or into an intermediate inoperative position, tool means carried by said bar, a bearing in which the front spindle portion is journaled for rotation about a generally longitudinal axis, means for supporting said bearing, a supporting member having a bearing in which the rear spindle of said bar is journaled, said supporting member including a crank axle having two crank arms, a sleeve fixed to each of said arms, an axle journaled in each of said sleeves, a supporting wheel journaled on each of said axles, a half revolution clutch associated with each of said wheels, means for rotating said axles upon actuation of said clutches, each of said axles having a crank, and means connecting said cranks with said rear spindle whereby actuation of one of said clutches rotates said spindle to move said bar from one operating position to an inoperative position and actuation of the other of said clutches rotates said spindle to move said bar from another operating position to an inoperative position.

CARL G. STRANDLUND.